United States Patent
Rafanello et al.

(10) Patent No.: US 6,427,215 B2
(45) Date of Patent: Jul. 30, 2002

(54) RECOVERING AND RELOCATING UNRELIABLE DISK SECTORS WHEN ENCOUNTERING DISK DRIVE READ ERRORS

(75) Inventors: Benedict Michael Rafanello, Round Rock; Vincent Brian Rapp; Barry Lowell Russell, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/798,864

(22) Filed: Mar. 1, 2001

Related U.S. Application Data (62) Division of application No. 09/283,364, filed on Mar. 31, 1999.

(51) Int. Cl.$^7$ ............................................. G11C 29/00
(52) U.S. Cl. ........................................ 714/710; 711/702
(58) Field of Search ................................ 714/710, 723, 714/718, 8, 7, 42, 31; 369/53.1, 53.15; 711/200, 202, 206

(56) References Cited

U.S. PATENT DOCUMENTS

| | | | |
|---|---|---|---|
| 5,189,566 A | | 2/1993 | Christensen et al. .......... 360/53 |
| 5,253,256 A | | 10/1993 | Oyama et al. ............. 371/40.1 |
| 5,437,020 A | * | 7/1995 | Wells et al. .................... 714/6 |
| 5,581,722 A | * | 12/1996 | Welland ..................... 711/207 |
| 5,633,767 A | | 5/1997 | Boutaghou et al. ........... 360/53 |
| 5,701,220 A | | 12/1997 | Koriyama ................... 360/106 |
| 5,740,349 A | | 4/1998 | Hasbun et al. ......... 395/182.06 |
| 5,742,934 A | * | 4/1998 | Shinohara ................... 711/103 |
| 5,745,326 A | | 4/1998 | Koriyama ................... 360/106 |
| 5,751,733 A | | 5/1998 | Glover ....................... 371/40.3 |
| 5,937,435 A | * | 8/1999 | Dobbek et al. ............. 711/202 |

\* cited by examiner

*Primary Examiner*—Christine T. Tu
(74) *Attorney, Agent, or Firm*—Jeffrey S. LaBaw; Bracewell & Patterson, L.L.P.

(57) ABSTRACT

Where a number n of read attempts are required to successfully read a data sector, with the first n-1 attempts returning a disk drive read error, the number of attempts required is compared to a predefined threshold selected to indicate that the sector is unreliable and is in danger of becoming completely unrecoverable. If the threshold number of attempts is not exceeded, the sector is presumed to still be good and no further action need be taken. If the threshold number of attempts was equaled or exceeded, however, the unreliable or failing sector is relocated to a reserved replacement sector, with the recovered data written to the replacement sector. The failing data sector is remapped to the replacement sector, which becomes a fully functional substitute for the failing sector for future reads and writes while preserving the original user data. Data within a failing sector is thus preserved before the sector becomes completely unrecoverable.

12 Claims, 5 Drawing Sheets

RECOVERING AND RELOCATING UNRELIABLE DISK SECTORS WHEN ENCOUNTERING DISK DRIVE READ ERRORS

This is a Division of application Ser. No. 09/283,364, filed Mar. 31, 1999, currently pending.

RELATED APPLICATIONS

The present invention is related to the subject matter of the following commonly assigned, copending United States patent and patent applications: U.S. Pat. No. 6,247,152 entitled "RELOCATING UNRELIABLE DISK SECTORS WHEN ENCOUNTERING DISK DRIVE READ ERRORS WITH NOTIFICATION TO USER WHEN DATA IS BAD" and issued Jun. 12, 2001; Ser. No. 09/283,366 entitled "ABILITY TO DISTINGUISH TRUE DISK WRITE ERRORS" and filed Mar. 31, 1999; and Ser. No. 09/282,873 entitled "RELOCATING SECTORS WHEN DISK DRIVE DOES NOT RETURN DISK WRITE ERRORS" and filed Mar. 31, 1999. The content of the above-referenced applications is incorporated herein by reference.

BACKGROUND OF THE INVENTION

1. Technical Field

The present invention relates in general to data storage on disk storage media and in particular to error handling and recovery for disk storage media. Still more particularly, the present invention relates to relocating unreliable disk sectors when read errors are received while reading data.

2. Description of the Related Art

Accurate and prompt reporting of write errors or faults to a disk drive by device drivers, adapters, and/or disk drives when an attempted write to the hard disk drive is unsuccessful represents the ideal situation for data protection. Under these conditions, the system or user application has an opportunity to preserve the data by writing it elsewhere. However, the error may not be detected when the data is written, the error may not be properly reported if detected, or the data may be corrupted after being written to the disk media. The first two circumstances depend on the presence, reliability, and/or thoroughness of error detection, reporting and correction mechanisms for the disk drive, adapter, and device driver. The last circumstance results from failure of the disk media for any one of a number of reasons such as head damage to the disk media, stray magnetic fields, or contaminants finding their way into the disk drive.

Virtually all contemporary disk drives can detect and report a bad data read from the disk media, typically through CRC errors. When CRC errors are returned from reading a sector, often the read may be retried successfully, and most file systems simply continue if the data was successfully recovered from the sector.

A sector for which reads must be retried multiple times is likely to be "failing," or in the process of becoming unrecoverable. Once a sector becomes unrecoverable, disk drives will normally perform relocation of the bad sector to a reserved replacement sector on the drive. However, sectors are generally relocated only after they have become unrecoverable, and typically a sector which may be successfully read is deemed good regardless of the number of attempts required to read the data. This may result in loss of data since the sector was not relocated prior to the sector becoming unrecoverable—that is, prior to the data becoming unreadable and therefore "lost."

It would be desirable, therefore, to provide a mechanism for detecting and relocating failing or unreliable disk sectors prior to complete loss of data within the sector.

SUMMARY OF THE INVENTION

It is therefore one object of the present invention to provide improved data storage on disk storage media.

It is another object of the present invention to provide improved error handling and recovery for disk storage media.

It is yet another object of the present invention to provide a mechanism for relocating unreliable disk sectors when read errors are received while reading data.

The foregoing objects are achieved as is now described. Where a number n of read attempts are required to successfully read a data sector, with the first n-1 attempts returning a disk drive read error, the number of attempts required is compared to a predefined threshold selected to indicate that the sector is unreliable and is in danger of imminently becoming completely unrecoverable. If the threshold number of attempts is not exceeded, the sector is presumed to still be good and no further action need be taken. If the threshold number of attempts was equaled or exceeded, however, the unreliable or failing sector is relocated to a reserved replacement sector, with the recovered data written to the replacement sector. The failing data sector is remapped to the replacement sector, which becomes a fully functional substitute for the failing sector for future reads and writes while preserving the original user data. Data within a failing sector is thus preserved before the sector becomes completely unrecoverable.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
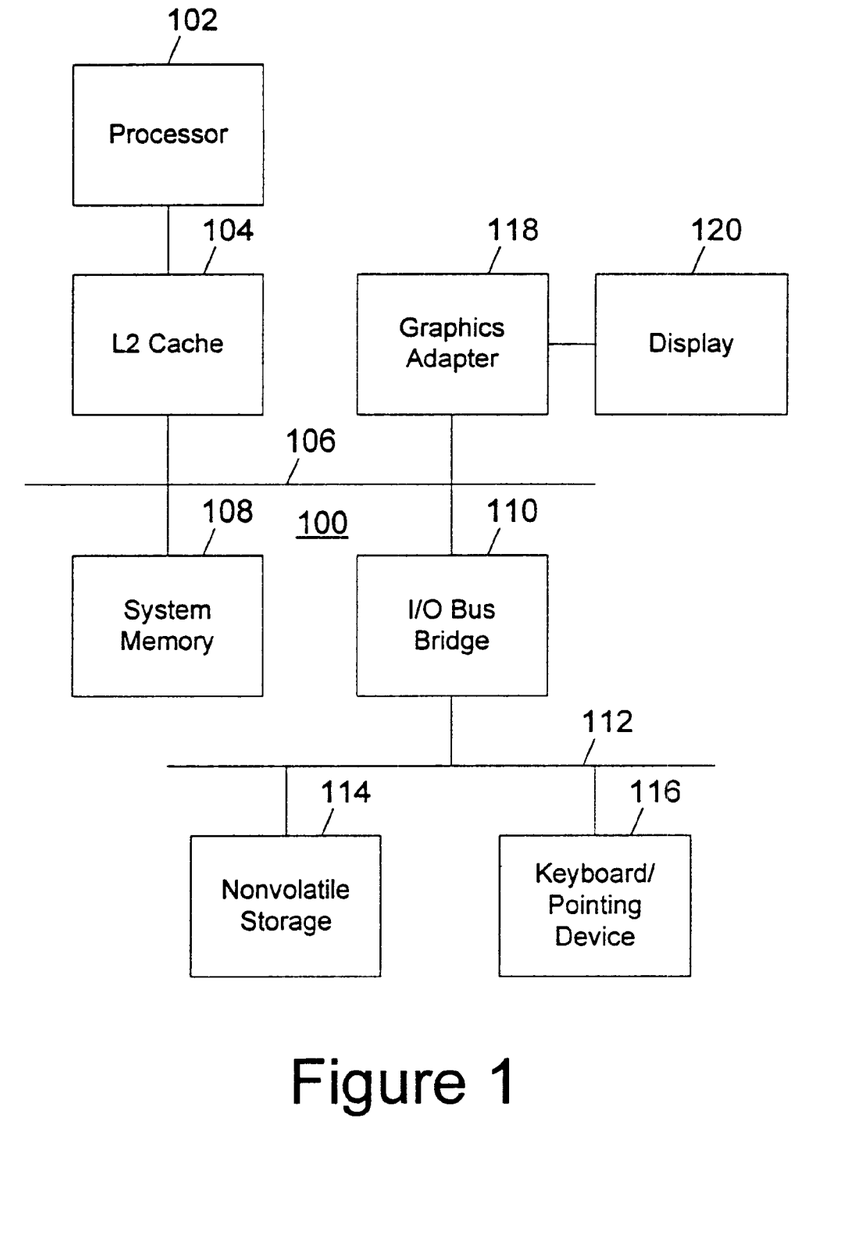
FIG. 1 depicts a block diagram of a data processing system and network in which a preferred embodiment.

With reference now to the figures, and in particular with reference to FIG. 1, a block diagram of a data processing system and network in which a preferred embodiment of the present invention may be implemented is depicted. Data processing system 100 may be, for example, one of the models of personal computers available from International Business Machines Corporation of Armonk, New York. Data processing system 100 includes a processor 102, which in the exemplary embodiment is connected to a level two (L2) cache 104, connected in turn to a system bus 106. In the exemplary embodiment, data processing system 100 includes graphics adapter 116 also connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. However, data processing system 100 is preferably programmed to provide a mechanism for relocating unreliable disk sectors.

Figure 2:
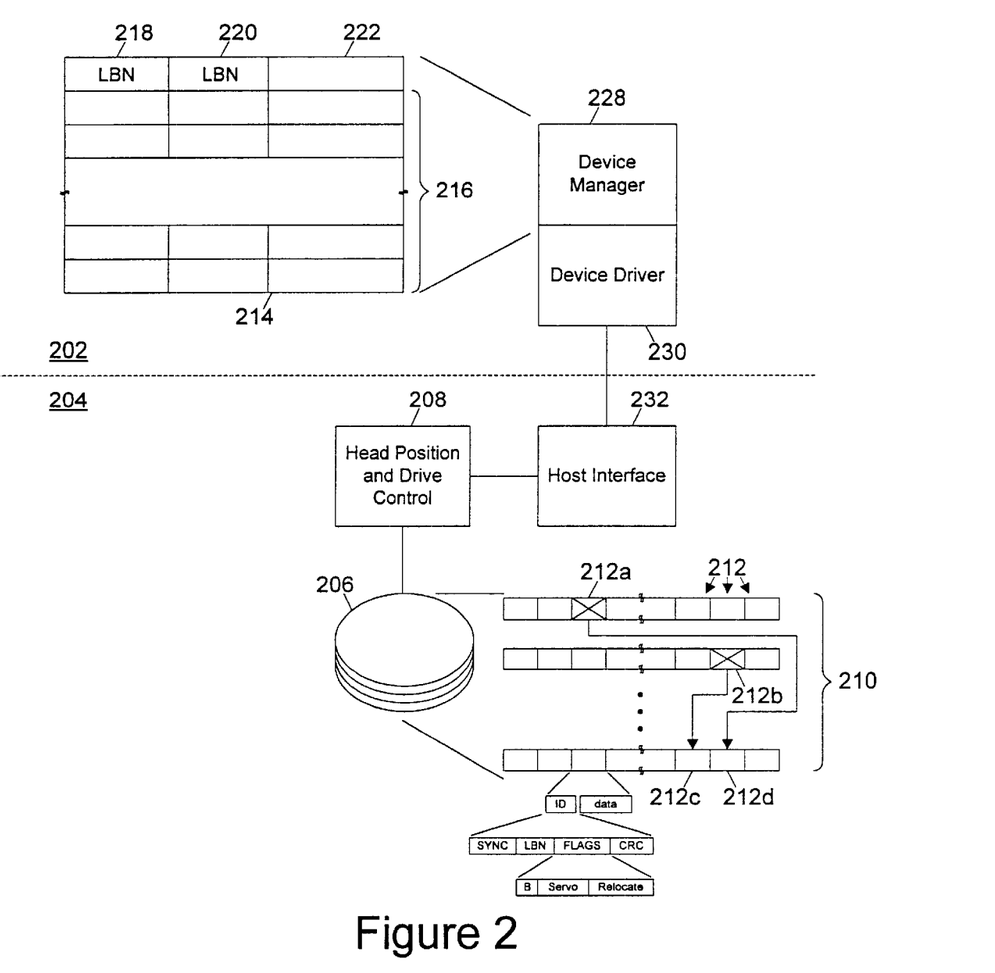
FIG. 2 is a diagram of a mechanism for relocating an unreliable sector in accordance with a preferred embodiment of the present invention.

Referring to FIG. 2, a diagram of a mechanism for relocating an unreliable sector in accordance with a preferred embodiment of the present invention is illustrated. The mechanism includes a host system 202, which may be data processing system 100 depicted in FIG. 1, and disk storage 204, such as nonvolatile storage 114 depicted in FIG. 1.

Disk storage 204 includes storage media 206, which is generally several magnetic storage disks spaced apart along a common central axis. In accordance with the known art, data is written to and read from storage media 206 by heads (not shown) positioned near storage media 206 as the disks are rotated by a drive motor (also not shown), with a separate head associated with each disk within storage media 206. The heads are moved in tandem over the surface of each respective disk within storage media 206, with the rotation of the disks and the position of the heads along a radius from the common ax s controlled by head position and drive control logic 208.

Storage media 206 is logically divided into a number of tracks 210, which are generally arranged in concentric circles on the surface of the disks forming storage media 206. Each track 210 usually includes servo fields containing positioning information used to locate the head over a specific track, identification and synchronization fields, a data region, and error correcting codes (ECC). Because the servo, identification, synchronization, and ECC fields are not utilized by the present invention, only data regions for tracks 210 are illustrated in FIG. 2 for simplicity.

The data portion of each track is divided into a number of data sectors 212 (also referred to a "blocks") of a predetermined size and format. In the standard format, each sector 212 typically includes an identification (ID) field and a data field. Identification fields, in turn, generally include a synchronization field required for reading the data, a logical block number (LBN) assigned to the sector and employed by the addressing scheme of host system 202 to identify the sector, flags, and a cyclic redundancy check (CRC) character or similar error correcting codes (ECC) The flags may include a flag ("B") indicating whether the sector is good or bad, sector servo split flags, and a relocate pointer.

A defect map table 214, which may be maintained by storage media 204 and/or the operating system for host system 202, contains entries 216 for each LBN 218 where an error has been detected. Until an unrecoverable sector is identified for storage media 204, defect map table 214 will contain no entries. As unrecoverable sectors are identified over the life of storage media 204, entries are added to defect map table 214. When an unrecoverable sector is identified, the failed sector is mapped within defect map table 214 to a replacement sector previously reserved by the operating system for host system 202. Each entry 216 thus contains the LBN 220 which addresses a previously reserved replacement sector to which LBN 218 has been relocated, and may also contain a flag as well as other information 222 about the sector identified by LBN 218 within an entry 216.

When an unreliable sector—a sector for which multiple read attempts are required to successfully read the sector data—such as sector 212a or 212b is identified during operation, the sector is remapped to a reserved spare or replacement sector 212c or 212d. The LBN 218 corresponding to the unreliable sector 212a or 212b is mapped to the LBN 220 of the corresponding replacement sector 212c or 212d, which may also be stored in the relocate pointer portion of an ID field for the appropriate unreliable sector 212a or 212b.

All disk drives can detect and report a bad data read from the disk media, typically through CRC errors. When CRC errors are returned from reading a sector, often the read may be retried successfully, and most file systems simply continue if the data was successfully recovered from the sector. Thus, a read request being handled by an operating system component 228 for storage disk 204 (often referred to as a "device manager" for disk 204) may encounter a CRC error returned from the device driver 230 for storage media 204, which receives the CRC error from host interface 232 of storage disk 204. The operating system component 228 will then attempt to recover the data within the sector being read by repeatedly retrying the read request.

If the data is successfully recovered by repetitively retrying the read request as described above, a determination is made of the number of read attempts required to successfully read the data. If the number of attempts exceeds a predefined limit (e.g., five), the sector is deemed to be unreliable or failing. The failing sector 212a is then relocated to a replacement sector 212d before the data is lost. Defect map table 214, which is accessible to operating system component 228, is appropriately updated. "Bad" bit or flag 222 in defect map table 214, in a defect map within disk 204 (not shown), and/or in failing sector 212a may be set for failing sector 212a. An "unusable" flag indicating whether the data within the replacement sector is good or bad (in this case good, since the data was recovered prior to relocation of the failing sector) may also be set.

When reads or writes are performed to a file containing a sector relocated due to unreliability, the operating system checks the LBNs of the sectors to be read against defect map table 214. If an entry containing an LBN 216 to be read or written is found, the replacement sector 212d is read instead of failing sector 212a. Failing sector 212a is no longer employed to hold data. Replacement sector 212d thus becomes a fully functional substitute for failed sector 212a which it replaced, and the original data is preserved from loss.

Figure 3:
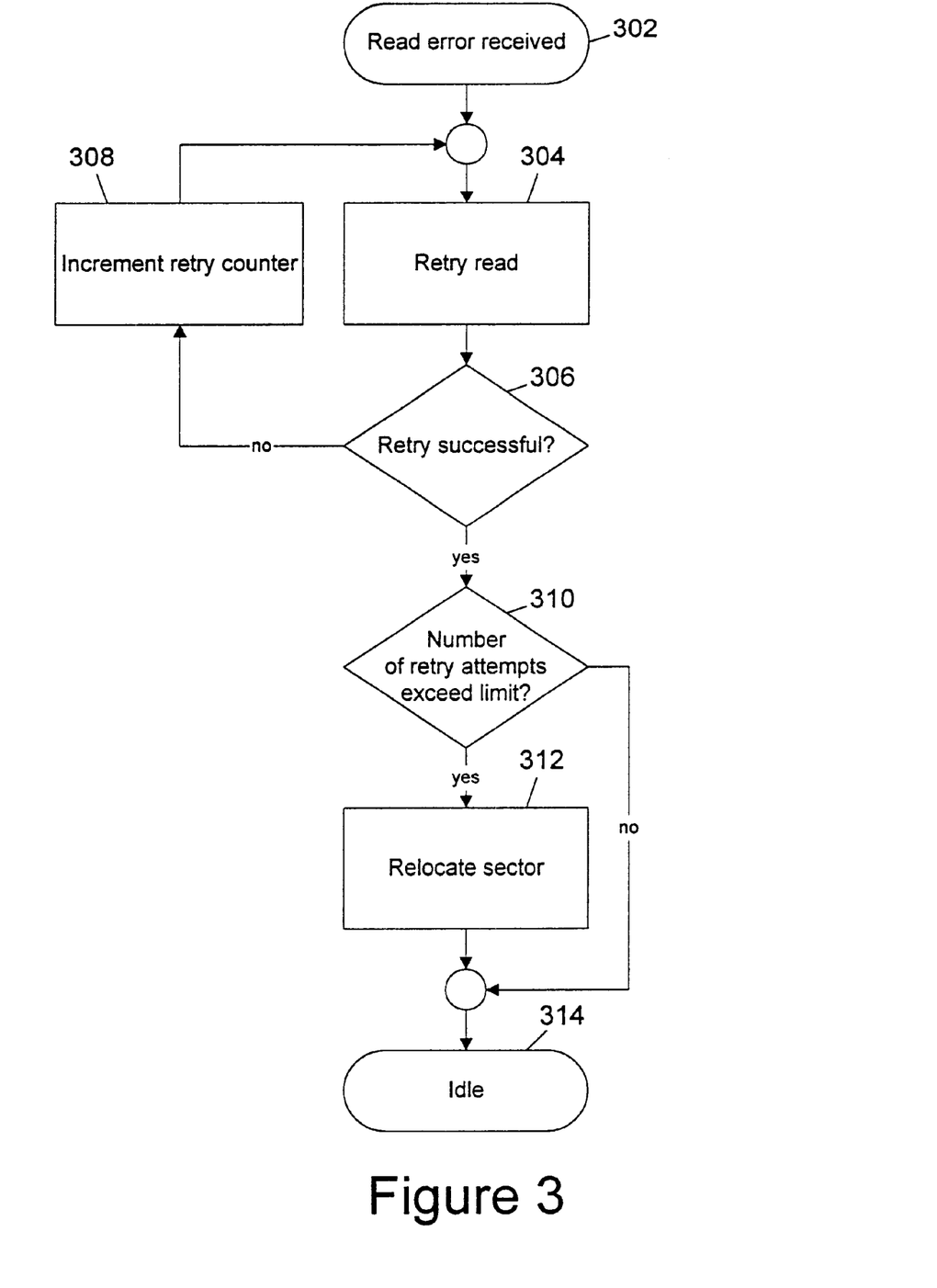
FIG. 3 depicts a high level flow chart for a process of relocating unreliable disk sectors when encountering disk drive read errors in accordance with a preferred embodiment of the present invention.

With reference now to FIG. 3, a high level flow chart for a process of relocating unreliable disk sectors when encountering disk drive read errors in accordance with a preferred embodiment of the present invention is depicted. The process begins at step 302, which depicts a CRC read error being returned by a disk drive to an operating system read request. The process first passes to step 304, which illustrates a retry of the read request by the operating system.

The process next passes to step 306, which depicts a determination of whether the retry request was successful. If not, the process proceeds to step 308, which illustrates incrementing a retry counter, and then returns to step 304 to again retry the read request. It should be noted that the sector data may not be successfully read after a predetermined number of retry attempts, indicating that the sector is unlikely to be successfully recovered. In this case, the operating system may simply deem the sector unrecoverable, and relocate the sector with a notification to the user that the sector data was lost.

The present invention, however, presumes that the sector data can be successfully recovered after a number of read attempts. In that circumstance, the process proceeds from step 306 to step 310, which illustrates a determination of whether the number of attempted reads required to successfully read the sector data exceeds a predefined reliability limit. The number of retry attempts selected as a threshold for reliability should balance the risk of total loss of the data against the loss of storage space. The number may be variable during the life of a disk storage device, with more retry attempts being tolerated as fewer replacement sectors remain available.

If the number of read attempts required to successfully read the data exceeds the reliability limit, the process proceeds to step 312, which depicts relocating the failing sector. The failing sector may be remapped to one of the operating system's reserved replacement sectors and written with the recovered data. All future reads and writes to the failing sector number will map to the replacement sector. For this case, the original user data was recovered, a bad sector was removed from use, and a good sector substituted in its place.

If the number of read attempts required to successfully read the data does not exceed the reliability limit, the sector is presumed to be good and no further action is taken. The process then proceeds to step 314, which illustrates the process becoming idle until another read error is received.

Figure 4:
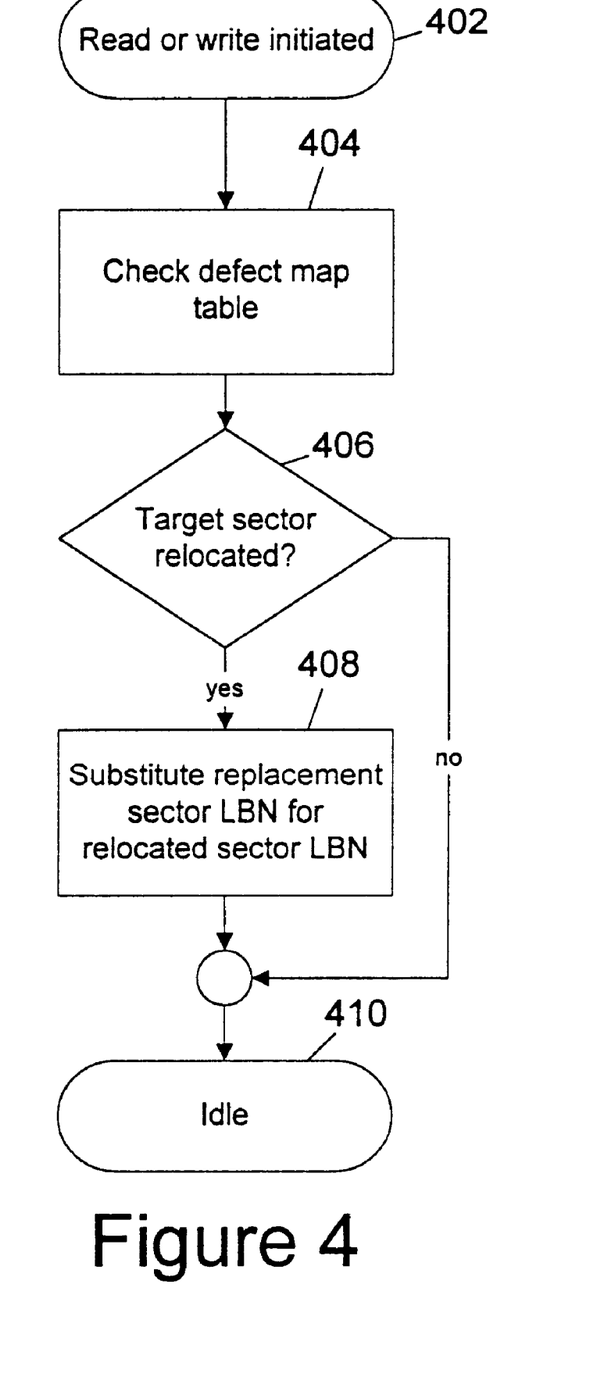
FIG. 4 is a high level flow chart for employing relocated, unreliable sectors in accordance with a preferred embodiment of the present invention.

Referring to FIG. 4, a high level flow chart for employing relocated, unreliable sectors in accordance with a preferred embodiment of the present invention is illustrated. The process begins at step 402, which depicts a read or write to a disk storage device being initiated, with the read or write request being detected by a an operating system device manager component for the disk storage device.

The process first passes to step 404, which illustrates the device manager checking the defect map table maintained for the disk storage device as described above, comparing the LBNs for the target sector(s) to entries, if any, within the defect map table. The process then passes to step 406, which illustrates a determination of whether any target sectors had previously been relocated, by comparing the target sector LBNs to relocated sector LBNs within the defect map table.

If any target sector for the detected disk read or write operation has been relocated, the process proceeds to step 408, which illustrates substituting the replacement sector LBN for the relocated target sector LBN for each target sector which has been relocated. Otherwise, the process proceeds directly to step 410, which illustrates the process becoming idle until another read or write operating to a disk storage device is detected.

The present invention allows unreliable sectors to be relocated to spare sectors with preservation of the data which would otherwise be lost when the sector becomes completely unrecoverable. An important aspect of the present invention is that it may be implemented within an operating system component, employing replacement sectors reserved by the operating system. This allows consistent handling of unreliable blocks regardless of the disk media or the capabilities of a disk drive which are involved.

Figure 5:
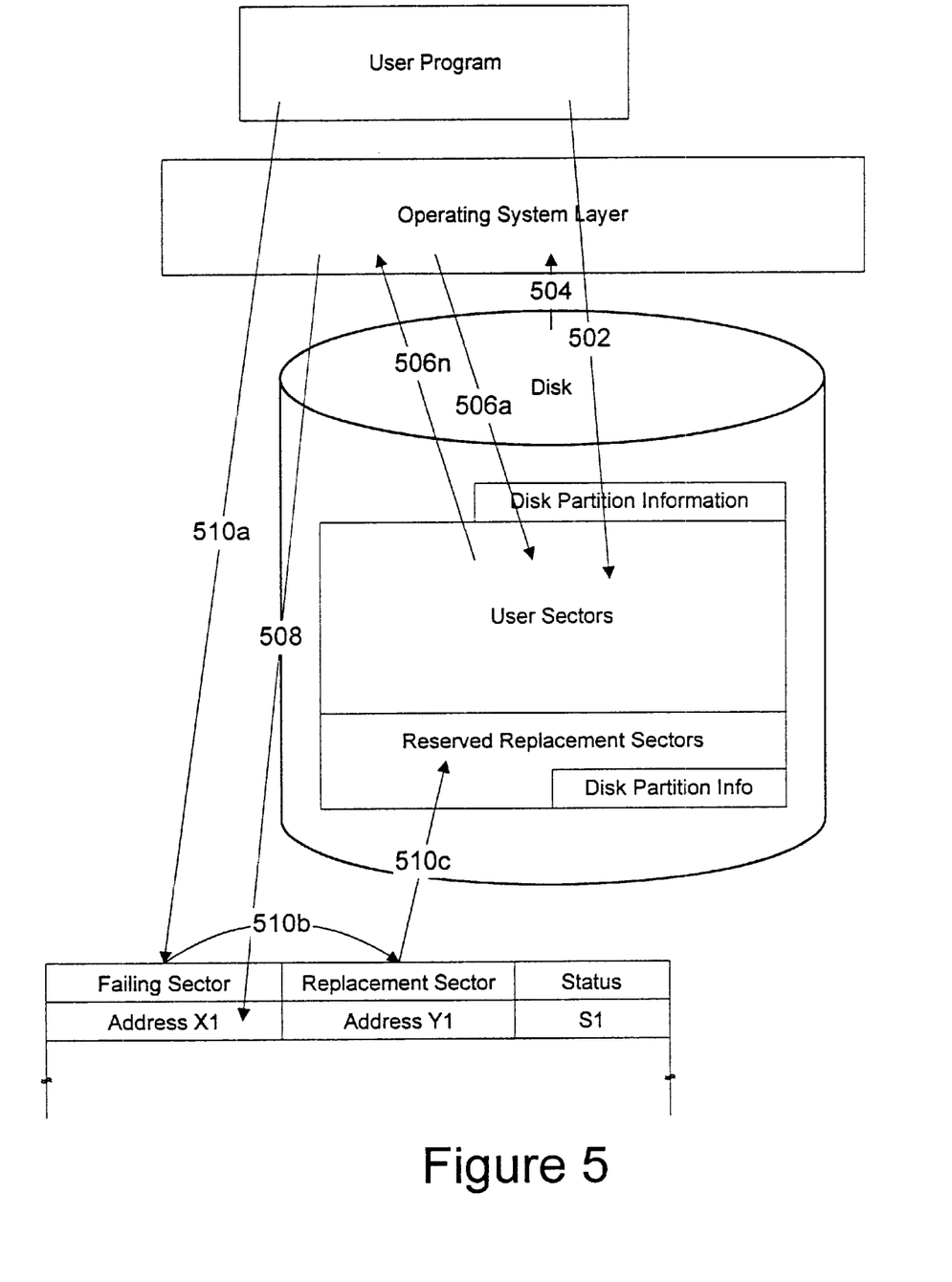
FIG. 5 depicts a data flow diagram for a process of detecting write errors and preserving user data despite failure of a disk to report write errors in accordance with a preferred embodiment of the present invention.

With reference now to FIG. 5, a data flow diagram for a process of detecting write errors and preserving user data despite failure of a disk to report write errors in accordance with a preferred embodiment of the present invention is depicted. FIG. 5 is a data flow diagram for a process of bad block relocation by an operating system.

When an operating system in accordance with the present invention is installed on a data processing system, and also at later times such as when a disk is added to the data processing system, the user is given the opportunity to create new data volumes which reside on disks within the system. A utility program allowing the user to enter information about the new volume creates the volumes within one or more partitions on a disk.

One volume feature which a user may specify is support, within the operating system, for relocation of bad blocks detected on disk media. When this feature is selected for a volume, the utility program will create an anchor block on the disk at a known location, such as at the very end of each partition making up the volume. The anchor block contains the addresses on the disk for a group of replacement sectors for that partition, reserved by the operating system. A table of addresses or a sized contiguous group of addresses starting at a known location, together with the number of replacement sectors reserved by the operating system, is stored in the anchor block.

The replacement sectors reserved by the operating system are invisible to the user, and cannot be utilized directly by the user. Prior to finishing creation of the volume, all replacement sectors are tested by the operating system to insure that, at least initially, these replacement sectors are good. During operation, the reserved replacement sectors are employed by the operating system to relocate failing user sectors.

FIG. 5 illustrates the flow of data and control for an operating system process of sector replacement on failing disk operations. A-user program issues a disk access 502 to a sector or block of sectors within the user area of a disk partition. The disk drive returns an error 504 to the operating system on the attempted disk access.

If necessary, the operating system individually accesses 506a the sectors which were being accessed when the error was returned, monitoring any errors returned 506n for individual sectors to identify failing sectors within the group. The operating system thereby identifies failing sectors within the group of sectors. Alternatively, if only one sector was being written when the error was returned, these steps may be skipped.

For each failing sector identified, the operating system creates an entry 508 within a mapping table to provide a pretested, reserved replacement sector for subsequent storage of data directed to the failing sector. The entry created will include the address of the failing sector, a corresponding address of the replacement sector designated to substitute for the failing sector, and status information regarding the data within the replacement sector.

Subsequent disk accesses 510a to the failing sector result in a lookup 510b in the mapping table and are then directed 510c to the replacement sector. In this manner, the failing sector is relocated to a reserved replacement sector by the operating system, preferably with no loss of user data. This may be performed on top of, or in addition to, any data relocation performed by a disk drive upon detection of bad sectors.

By retrying a read which previously resulted in a read error some large number of times, marginally bad sectors may finally return the original user data. However, it is obvious that the sector should not be trusted in the future and should be replaced. Once the user data has been recovered, the marginal sector can be remapped to one of the pretested replacement sectors provided by the operating system. In this way, defective sectors can be removed from use before they become totally unusable and the user data is lost.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of employing relocated sectors, comprising:
   detecting a disk access operation to a disk storage device in an operating system component managing the disk storage device;
   checking a defect map table identifying relocated sectors within the disk storage device, wherein said relocated sectors are in replacement sectors reserved by said operating system; and
   responsive to determining that a target sector for the detected disk access operation has been relocated, substituting an identifier for a replacement sector to which the target sector was relocated for an identifier for the relocated target sector within the detected disk access operation.

2. The method of claim 1, wherein the step of detecting a disk access operation to a disk storage device in an operating system component managing the disk storage device further comprises:
   detecting a read or write including the identifier for the target sector.

3. The method of claim 2, wherein the step of checking a defect map table identifying relocated sectors within the disk storage device further comprises:
   comparing the identifier for the target sector to identifiers of relocated sectors within entries in the defect map table.

4. The method of claim 1, wherein the step of substituting an identifier for a replacement sector to which the target sector was relocated for an identifier for the relocated target sector within the detected disk access operation further comprises:
   substituting a logical block number for the replacement sector for a logical block number for the target sector within the disk access operation.

5. A system for employing relocated sectors, comprising:
   a disk storage device;
   a memory containing a defect map identifying relocated sectors on the disk storage device, wherein said relocated sectors are in replacement sectors reserved by an operating system; and
   a processor coupled to the disk storage device and the memory and executing a disk access process including:
      detecting a disk access operation to the disk storage device in said operating system component managing the disk storage device;
      checking the defect map table; and
      responsive to determining that a target sector for the detected disk access operation has been relocated, substituting an identifier for a replacement sector to which the target sector was relocated for an identifier for the relocated target sector within the detected disk access operation.

6. The system of claim 5, wherein the disk access process detects a read or write including the identifier for the target sector.

7. The system of claim 6, wherein the disk access process compares the identifier for the target sector to identifiers of relocated sectors within entries in the defect map table.

8. The system of claim 5, wherein the disk access process substitutes a logical block number for the replacement sector for a logical block number for the target sector within the disk access operation.

9. A computer program product within a computer usable medium for employing relocated sectors, comprising:
   instructions for detecting a disk access operation to a disk storage device in an operating system component managing the disk storage device;
   instructions for checking a defect map table identifying relocated sectors within the disk storage device, wherein said relocated sectors are replacement sectors reserved by said operating system; and
   instructions, responsive to determining that a target sector for the detected disk access operation has been relocated, for redirecting the disk access operation to a replacement sector to which the target sector was relocated.

10. The computer program product of claim 9, wherein the instructions for detecting a disk access operation to a disk storage device in an operating system component managing the disk storage device further comprise:
    instructions for detecting a read or write including the identifier for the target sector.

11. The computer program product of claim 10, wherein the instructions for checking a defect map table identifying relocated sectors within the disk storage device further comprise:
    instructions for comparing the identifier for the target sector to identifiers of relocated sectors within entries in the defect map table.

12. The computer program product of claim 9, wherein the instructions for redirecting the disk access operation to a replacement sector to which the target sector was relocated further comprise:
    instructions for substituting a logical block number for the replacement sector for a logical block number for the target sector within the disk access operation.

* * * * *

UNITED STATES PATENT AND TRADEMARK OFFICE
CERTIFICATE OF CORRECTION

PATENT NO.   : 6,427,215 B2
DATED        : July 30, 2002
INVENTOR(S)  : Rafanello et al.

It is certified that error appears in the above-identified patent and that said Letters Patent is hereby corrected as shown below:

<u>Column 3,</u>
Lines 50-51, replace:
"the common ax s controlled by head position and drive control logic 208."
with:
-- the common axis controlled by head position and drive control logic 208. --

Signed and Sealed this

Eighteenth Day of February, 2003

JAMES E. ROGAN
*Director of the United States Patent and Trademark Office*